United States Patent
Masumura et al.

(10) Patent No.: US 11,462,212 B2
(45) Date of Patent: Oct. 4, 2022

(54) DOCUMENT IDENTIFICATION DEVICE, DOCUMENT IDENTIFICATION METHOD, AND PROGRAM

(71) Applicant: NIPPON TELEGRAPH AND TELEPHONE CORPORATION, Chiyoda-ku (JP)

(72) Inventors: Ryo Masumura, Yokosuka (JP); Hirokazu Masataki, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 83 days.

(21) Appl. No.: 16/613,304

(22) PCT Filed: May 10, 2018

(86) PCT No.: PCT/JP2018/018051
§ 371 (c)(1),
(2) Date: Nov. 13, 2019

(87) PCT Pub. No.: WO2018/212055
PCT Pub. Date: Nov. 22, 2018

(65) Prior Publication Data
US 2021/0082415 A1    Mar. 18, 2021

(30) Foreign Application Priority Data
May 17, 2017   (JP) .............................. JP2017-098365

(51) Int. Cl.
*G10L 15/18*      (2013.01)
*G06N 3/08*       (2006.01)
(Continued)

(52) U.S. Cl.
CPC ............ *G10L 15/1822* (2013.01); *G06N 3/08* (2013.01); *G10L 15/16* (2013.01); *G10L 15/197* (2013.01);
(Continued)

(58) Field of Classification Search
CPC . G10L 15/1822; G10L 15/16; G10L 15/1815; G10L 15/197; G10L 15/22; G06N 3/08
See application file for complete search history.

(56) References Cited

PUBLICATIONS

Mohamed Bouaziz et al., "Parallel Long Short Term Memory for Multi-Stream Classification", 2016, IEEE, 218-223 (Year: 2016).*

(Continued)

*Primary Examiner* — Michelle M Koeth
*Assistant Examiner* — Darioush Agahi
(74) *Attorney, Agent, or Firm* — Oblon, McClelland, Maier & Neustadt, L.L.P.

(57) ABSTRACT

A document identification device that improves class identification precision of multi-stream documents is provided. The document identification device includes: a primary stream expression generation unit that generates a primary stream expression, which is a fixed-length vector of a word sequence corresponding to each speaker's speech recorded in a setting including a plurality of speakers, for each speaker; a primary multi-stream expression generation unit that generates a primary multi-stream expression obtained by integrating the primary stream expression; a secondary stream expression generation unit that generates a secondary stream expression, which is a fixed-length vector generated based on the word sequence of each speaker and the primary multi-stream expression, for each speaker; and a secondary multi-stream expression generation unit that generates a secondary multi-stream expression obtained by integrating the secondary stream expression.

11 Claims, 3 Drawing Sheets

(51) Int. Cl.
*G10L 15/16* (2006.01)
*G10L 15/197* (2013.01)
*G10L 15/22* (2006.01)
*H04M 3/42* (2006.01)

(52) U.S. Cl.
CPC ......... *G10L 15/22* (2013.01); *H04M 3/42221* (2013.01); *H04M 2201/405* (2013.01)

(56) References Cited

PUBLICATIONS (Jing Huang, Etienne Marcheret, Karthik Visweswariah) Rapid Feature Space Speaker Adaptation for Multi Stream HMM Based Audio Visual Speech Recognition IEEE (Year: 2005).*
Bouaziz et al., Improving Multi-Stream Classification by Mapping Sequence-Embedding in a High Dimensional Space, IEEE, pp. 224-231 (Year: 2016).*
International Search Report dated Aug. 7, 2018 in PCT/JP2018/018051 filed May 10, 2018.
Bouaziz, M. et al., "Parallel Long Short-Term Memory for Multi-Stream Classification," Proceedings of IEEE Spoken Language Technology Workshop (SLT), 2016, pp. 218-223.
Yang, Z. et al., "Hierarchical Attention Networks for Document Classification," Proceedings of Annual Conference of the North American Chapter of the Association for Computational Linguistics: Human Language Technologies (NAACL-HLT), 2016, pp. 1480-1489.

* cited by examiner

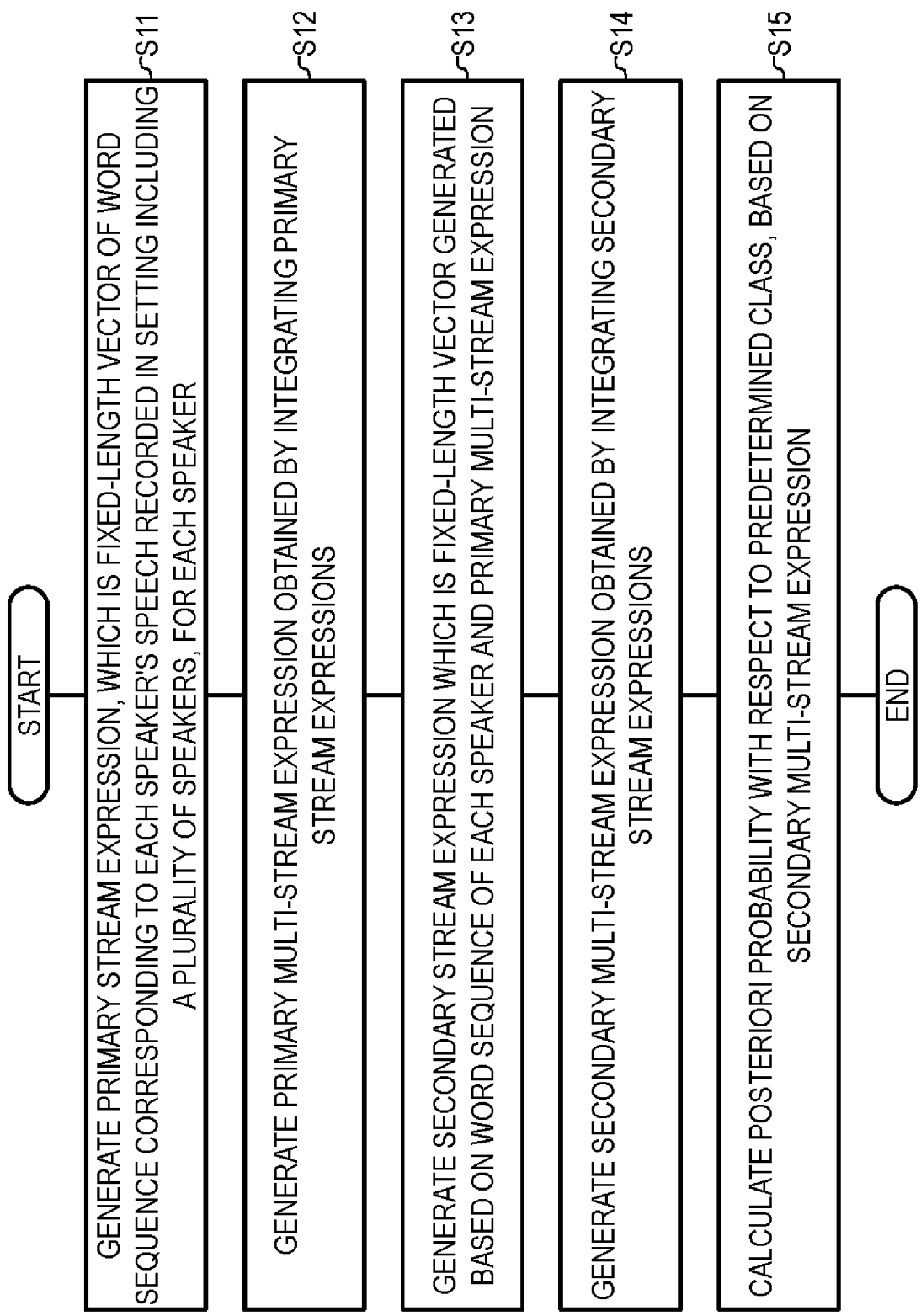

DOCUMENT IDENTIFICATION DEVICE, DOCUMENT IDENTIFICATION METHOD, AND PROGRAM

TECHNICAL FIELD

The present invention relates to a document identification device, a document identification method, and a program by which a document or the like obtained by transcribing speech, which is recorded for each speaker, is identified to be in a predetermined class.

BACKGROUND ART

There are needs for a technique (class sorting) by which automatic recognition results to speech taken in call centers, meetings, and so on and documents obtained by manually transcribing the speech are identified to be in (sorted into) predetermined classes. A purpose of a call is required to be automatically identified in a call center, for example. According to the technique, it is possible to automatically identify one class among classes for sorting purposes of a call such as cancellation of contract, a new contract, and inquiries for a password and an ID, for example, and utilize the class for data mining.

Speech is separately recorded for respective speakers in call centers and meetings, for example, in general. Accordingly, speech can be converted into texts for respective persons who have attended calls and meetings and thus, which speaker has brought out which word is clear. A document which is obtained by integrating a speech recognition result of each speaker and a document obtained by manually transcribing the speech is referred to as a multi-stream document hereinafter. For example, a speech recognition result of a customer and a speech recognition result of an operator are integrated to generate a multi-stream document in a call center.

Constructing a class sorter typically employs a method that data with labels are prepared to automatically construct a class sorter with machine learning. When multi-stream documents are used, a class sorter can be learned by preparing a large amount of data in which one label is attached to one multi-stream document.

Non-patent Literature 1, for example, provides a technique for identifying a class of a document by using a multi-stream document. Non-patent Literature 1 employs a method in which recurrent neural network (RNN) structures are prepared for respective streams (texts corresponding to speech uttered by respective persons who have attended calls and meetings), the respective streams are converted into fixed-length (fixed-dimension) vectors, and then, the pieces of information are integrated to perform identification, with respect to a target multi-stream document. It is preferable that a long short-term memory, a gated recurrent unit, and a bidirectional RNN are included as the RNN structure. Since the RNN is one of techniques based on deep learning and is a well-known technique, a description thereof is omitted. An advantageous point using the RNN structure is a point that a mechanism for converting a document including an arbitrary number of words into a fixed-length vector is provided and accordingly, direct input data can be dealt in an identification function. When K kinds (K corresponds to the number of participants) of streams are used and a word sequence on the k-th kind of stream is expressed as $w_{k1}, w_{k2}, \ldots, w_{kT_k}$, processing as the following one is executed in Non-patent Literature 1.

$S_k = \text{RNN}(w_{k1}, w_{k2}, \ldots, w_{kT_k})$
$O = \text{DISCRIMINATE}(s_1, s_2, \ldots, s_K)$ Here, $s_k$ denotes a fixed-length vector corresponding to the k-th kind of stream. Further, O denotes an output representing a posteriori probability corresponding to each class. RNN( ) denotes a function having a feature of the RNN. DISCRIMINATE denotes a function for performing identification based on a vector subjected to fixed length processing and a softmax function can be used, for example. Since the softmax function is a well-known technique and description thereof is omitted. In identification, identification into a class having the maximum probability in O is performed. Non-patent Literature 1 discloses details of each processing.

PRIOR ART LITERATURE

Non-Patent Literature

Non-patent Literature 1: M. Bouaziz, M. Morchid, R. Dufour, G. Linars, and R. D. Mori, "Parallel long short-term memory for multi-stream classification," In Proc. IEEE Spoken Language Technology Workshop (SLT), pp. 218-223, 2016.

Non-patent Literature 2: Z. Yang, D. Yang, C. Dyer, X. He, A. J. Smola, and E. H. Hovy, "Hierarchical attention networks for document classification," In Proc. Annual Conference of the North American Chapter of the Association for Computational Linguistics: Human Language Technologies (NAACL-HLT), pp. 1480-1489, 2016.

SUMMARY OF THE INVENTION

Problems to be Solved by the Invention

When each stream is converted into a fixed-length vector, information of other streams are not utilized at all in Non-patent Literature 1. A fixed-length vector of each stream is obtained by embedding information of each stream so that information seemed to be useful for identification remains. Accordingly, high identification performance cannot be expected unless information useful for identification is embedded in a fixed-length vector corresponding to each stream.

Information useful for identification is often common information among streams. That is, it is conceivable that information important in a certain stream is important also in other streams. Considering a call center, for example, it can be said that a common topic between words spoken by an operator and words spoken by a customer is important information. Such knowledge is not utilized in above-described Non-patent Literature 1.

Therefore, the above-described knowledge is to be realized in the RNN structure to solve the above-mentioned problem. That is, a mechanism in which information included in other streams are also utilized when a certain stream is converted into a fixed-length vector is introduced. Specifically, after pieces of information of all streams are once integrated as a fixed-length vector, the fixed-length vector is utilized as additional information when each stream is read again. Accordingly, a fixed-length vector emphasizing on important parts can be structured for each stream.

Means to Solve the Problems

In order to realize the above-described processing, a document identification device according to the present invention includes a primary stream expression generation unit, a primary multi-stream expression generation unit, a secondary stream expression generation unit, and a secondary multi-stream expression generation unit. The primary stream expression generation unit generates a primary stream expression, which is a fixed-length vector of a word sequence corresponding to each speaker's speech recorded in a setting including a plurality of speakers, for each speaker. The primary multi-stream expression generation unit generates a primary multi-stream expression obtained by integrating the primary stream expression. The secondary stream expression generation unit generates a secondary stream expression, which is a fixed-length vector generated based on the word sequence of each speaker and the primary multi-stream expression, for each speaker. The secondary multi-stream expression generation unit generates a secondary multi-stream expression obtained by integrating the secondary stream expression.

Effects of the Invention

According to the document identification device of the present invention, class identification accuracy for a multi-stream document is improved.

BRIEF DESCRIPTION OF THE DRAWINGS

FIG. 2 is a flowchart illustrating an operation of the document identification device according to the first embodiment.

FIG. 3 is a schematic view for explaining calculation with a RNN function.

DETAILED DESCRIPTION OF THE EMBODIMENTS

Figure 1:
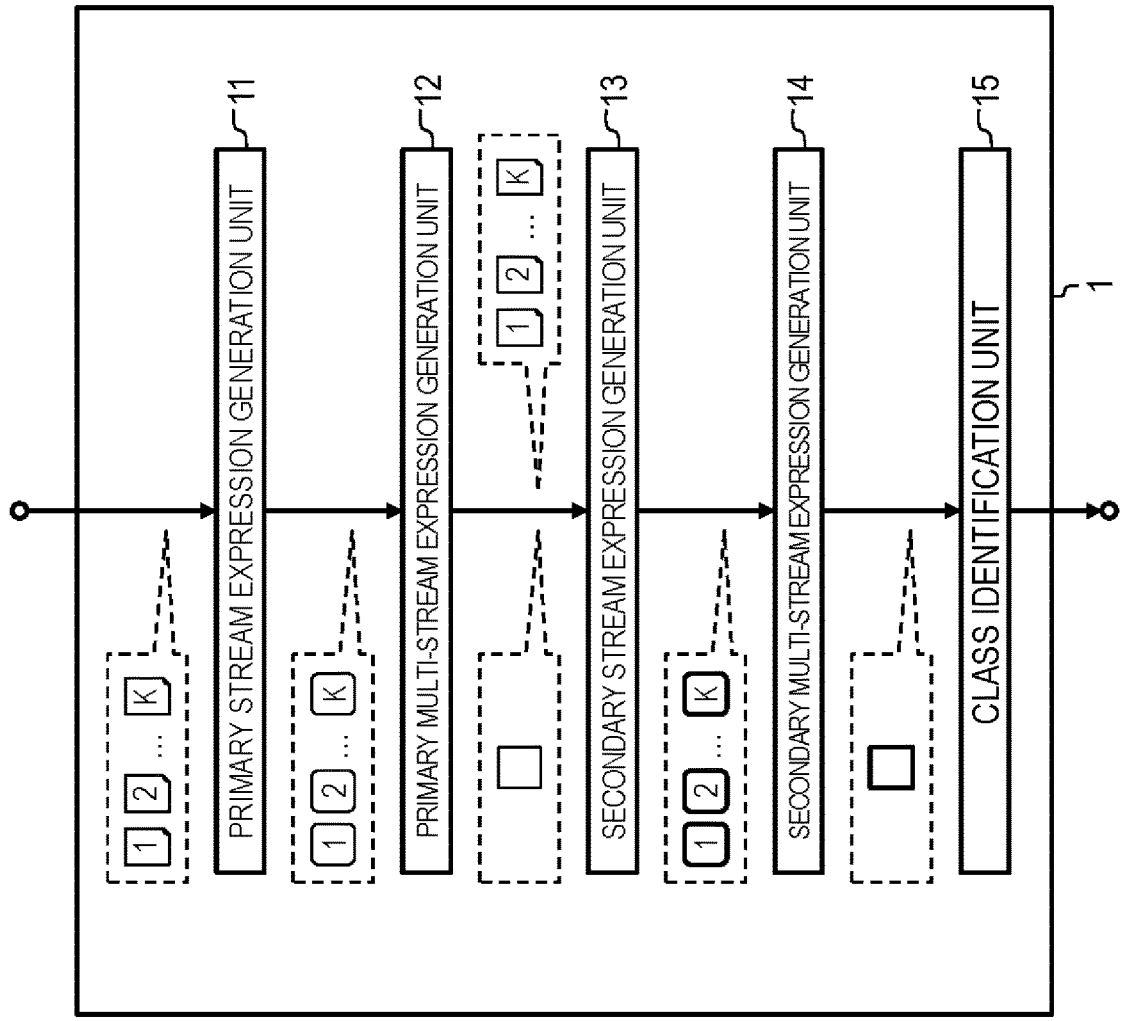
FIG. 1 is a block diagram illustrating a configuration of a document identification device according to a first embodiment.

An embodiment according to the present invention is described in detail below. Components having the same functions are provided with the same reference numerals and duplicate descriptions thereof are omitted.

First Embodiment

A configuration of a document identification device according to a first embodiment is described below with reference to FIG. 1. A document identification device 1 according to the present embodiment includes a primary stream expression generation unit 11, a primary multi-stream expression generation unit 12, a secondary stream expression generation unit 13, a secondary multi-stream expression generation unit 14, and a class identification unit 15, as illustrated in FIG. 1.

Operations of respective components are described below with reference to FIG. 2.

<Primary Stream Expression Generation Unit 11>

Input: Word sequence corresponding to speech of each speaker. Also referred to as a word sequence of each stream. A word sequence composed of $T_k$ pieces ($T_k$ is an arbitrary positive integer) of words in the k-th kind of stream (k-th speaker; k=1, 2, . . . , K) is expressed as $w_{k1}, w_{k2}, \ldots, w_{kTk}$.

Output: Primary Stream Expression

The primary stream expression generation unit 11 generates a fixed-length vector from a word sequence (word sequence of each stream) corresponding to each speaker's speech among respective speakers' speech recorded in a setting including a plurality of speakers (S11). A fixed-length vector generated in step S11 is referred to as a primary stream expression hereinafter. Step S11 is executed to each stream. The case of a call center, for example, handles two streams for an operator and a customer, so that the primary stream expression generation unit 11 generates a primary stream expression to each of the two streams.

The primary stream expression generation unit 11 executes the following processing, for example, with respect to the word sequence $w_{k1}, w_{k2}, \ldots, w_{kTk}$ composed of $T_k$ pieces of words corresponding to the k-th kind of stream.

$s_k = RNN(w_{k1}, w_{k2}, \ldots, w_{kTk})$

Figure 3A:
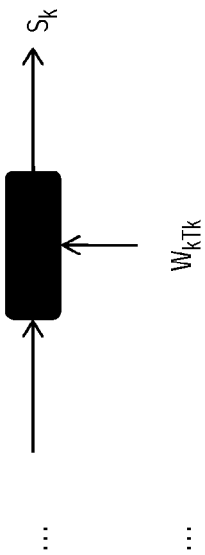
FIG. 3A is a schematic view for explaining calculation in which words are put in a RNN structure in sequence and an intermediate layer of the RNN structure is outputted to obtain a fixed-length vector $s_k$.

Here, $s_k$ denotes a fixed-length vector which is expressed as a primary stream expression of the k-th kind of stream. RNN( ) denotes a function having a feature of the RNN and includes a long short-term memory and a GRU, for example. In a typical RNN, for example, words are put into a RNN structure in sequence and an intermediate layer of the RNN structure is outputted as $s_k$ as illustrated in FIG. 3A. In this calculation, an arbitrary function may be used as long as a sequence having an arbitrary length can be used as a fixed-length vector by the function and a hierarchical attention network as the one used in Non-patent Literature 2, for example, may be used.

<Primary Multi-Stream Expression Generation Unit 12>

Input: Primary stream expression of each stream

Output: Primary multi-stream expression

The primary multi-stream expression generation unit 12 integrates primary stream expressions of respective streams to generate a primary multi-stream expression (S12). The primary multi-stream expression generation unit 12 generates one primary multi-stream expression from two primary stream expressions, for example.

When it is assumed that there are K kinds of streams in all and primary stream expressions of respective streams are expressed as $s_1, s_2, \ldots, s_K$, the primary multi-stream expression generation unit 12 executes the following processing, for example.

$$V = \sum_{k=1}^{K} s_k$$

Here, V denotes a fixed-length vector expressed as a primary multi-stream expression. In step S12, any calculation may be employed as long as a fixed-length vector is generated from $s_1, s_2, \ldots, s_K$ with the calculation. The primary multi-stream expression generation unit 12 may generate a coupling vector of $s_1, s_2, \ldots, s_K$ as a primary multi-stream expression, for example.

In the formula described above, all the primary stream expressions $s_1, s_2, \ldots, s_K$ are integrated to generate the primary multi-stream expression V. However, not limited to this, the primary multi-stream expression V may be generated by integrating only part of the primary stream expressions $s_1, s_2, \ldots, s_K$ (for example, only $s_j$; $1 \le i < j \le K$).

<Secondary Stream Expression Generation Unit 13>

Input: Word sequence of each stream, primary multi-stream expression

Output: Secondary stream expression

The secondary stream expression generation unit 13 is a component that reads a word sequence of each speaker again by using a primary multi-stream expression as additional information so as to regenerate a stream expression. That is, the secondary stream expression generation unit 13 generates a fixed-length vector for each stream again based on a word sequence of each stream and a generated primary multi-stream expression (S13). A fixed-length vector regenerated in step S13 is referred to as a secondary stream expression hereinafter. The case of a call center, for example, handles two streams for an operator and a customer, so that the secondary stream expression generation unit 13 generates a secondary stream expression to each of the two streams.

The secondary stream expression generation unit 13 generates a fixed-length vector called a secondary stream expression again from the word sequence of the k-th kind of stream ($w_{k1}, w_{k2}, \ldots, w_{kTk}$) and the fixed-length vector V expressed as the primary multi-stream expression. The secondary stream expression generation unit 13 executes the following processing, for example.

Figure 3B:
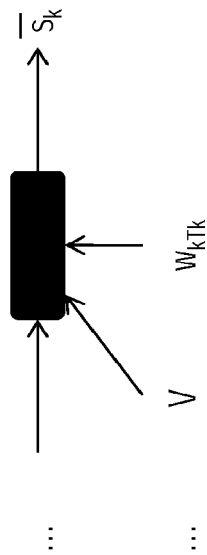
FIG. 3B is a schematic view for explaining calculation in which an operation for simultaneously inputting a word sequence $w_{k1}$, $w_{k2}$, $w_{kTk}$, composed of $T_k$ pieces of words and a fixed-length vector V expressed as a primary multi-stream expression into a RNN is performed for each word and an output on the intermediate layer of the RNN is acquired as a fixed-length vector $S^-_k$ representing a regenerated stream expression for the k-th kind of stream.

$\bar{s}_k = \mathrm{RNN}(w_{k1}, w_{k2}, \ldots, w_{kTk}, V)$ $s^-_k$ denotes a fixed-length vector representing a regenerated stream expression (secondary stream expression) for the k-th kind of stream. RNN( ) denotes a function having a feature of a recurrent neural network (RNN) and an arbitrary function may be used as long as the function has the same feature similarly to the above-described case. For example, the secondary stream expression generation unit 13 performs an operation for simultaneously inputting $w_{k1}$, $w_{k2}, w_{kTk}$ and V into the RNN for each word and acquires an output on the intermediate layer of the RNN as $s^-_k$, as illustrated in FIG. 3B.

<Secondary Multi-Stream Expression Generation Unit 14>

Input: Secondary stream expression of each stream

Output: Secondary multi-stream expression

The secondary multi-stream expression generation unit 14 is a component that generates a multi-stream expression again by integrating regenerated stream expressions. That is, the secondary multi-stream expression generation unit 14 integrates secondary stream expressions to generate a secondary multi-stream expression (S14). The secondary multi-stream expression generation unit 14 generates one secondary multi-stream expression from two secondary stream expressions, for example.

When secondary stream expressions of respective streams of K kinds of streams are expressed as $s^-_1, s^-_2, \ldots, s^-_K$, the secondary multi-stream expression generation unit 14 executes the following processing, for example.

$$\bar{V} = \sum_{k=1}^{K} \bar{s}_k$$

Here, V⁻ denotes a fixed-length vector expressed as a secondary multi-stream expression. If it is assumed to perform the same calculation as that of the primary multi-stream expression generation unit 12, the secondary multi-stream expression generation unit 14 may execute calculation of other functions having similar features.

<Class Identification Unit 15>

Input: Secondary multi-stream expression

Output: Posteriori probability with respect to each class

The class identification unit 15 calculates a posteriori probability with respect to a predetermined class, based on a secondary multi-stream expression (S15). Step S15 is executed with respect to each class.

The class identification unit 15 calculates a posteriori probability with respect to each class based on a fixed-length vector V⁻ expressed as a secondary multi-stream expression with the following formula, for example.

O=DISCRIMINATE(V̄)

<Modification>

In the above-described embodiment, each of steps S13 and S14 is executed once. However, not limited to the above-described embodiment, steps S13 and S14 may be recursively executed. That is, the secondary multi-stream expression generated by the secondary multi-stream expression generation unit 14 in step S14 may be recursively used in the secondary stream expression generation unit 13. In other words, the secondary stream expression generation unit 13 may generate a fixed-length vector for each stream again by using the secondary multi-stream expression generated in step S14 and a word sequence, in step S13 which is executed on and after the second time. Repeated execution of steps S13 and S14 enables important information to further stand out. V⁻ obtained by repeating steps S13 and S14 three times, for example, can be set as an input to the class identification unit 15.

Advantageous Effects

The document identification device 1 according to the present embodiment enables embedding emphasizing on important part throughout a multi-stream document when each stream is converted into a fixed-length vector. This enables construction of a highly-precise identification model for a multi-stream document.

<Appendix>

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned features and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiment, but modifications may be made within the scope of the present invention. Also, the processes described in the embodiment may be executed not only in a chronological sequence in accordance with the order of their description but may be executed in parallel or separately according to the processing capability of the device executing the processing or any necessity.

As already mentioned, when the processing functions of the hardware entity described in the embodiment (the device of the present invention) are to be embodied with a computer, the processing details of the functions to be provided by the hardware entity are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

What is claimed is:

1. A document identification device comprising:
  processing circuitry configured to
    provide a first intermediate layer of a neural network based on deep learning that generates a primary stream expression for each speaker, the primary stream expression being a fixed-length vector of a word sequence corresponding to each speaker's speech recorded in a setting including a plurality of speakers;
    generate a primary multi-stream expression obtained by integrating the primary stream expression;
    provide a second intermediate layer of the neural network that generates a secondary stream expression for each speaker, the secondary stream expression being a fixed-length vector generated by inputting the word sequence of each speaker and the primary multi-stream expression simultaneously into the second intermediate layer of the neural network;
    generate a secondary multi-stream expression obtained by integrating the secondary stream expression.

2. The document identification device according to claim 1, wherein the secondary stream expression is a fixed-length vector that is generated by calculating a function having a feature of a recurrent neural network based on the word sequence and the primary multi-stream expression.

3. A non-transitory computer-readable medium that stores a program for making a computer function as the document identification device according to claim 2.

4. A non-transitory computer-readable medium that stores a program for making computer function as the document identification device according to claim 1.

5. The document identification device according to claim 1, comprising:
  processing circuitry configured to
  calculate a posteriori probability with respect to a predetermined class, based on the secondary multi-stream expression.

6. The document identification device according to claim 5, wherein the secondary stream expression is a fixed-length vector that is generated by calculating a function having a feature of a recurrent neural network based on the word sequence and the primary multi-stream expression.

7. A non-transitory computer-readable medium that stores a program for making computer function as the document identification device according to claim 5.

8. A document identification method executed by a document identification device, the document identification method comprising:
  a step for generating a primary stream expression for each speaker by a first intermediate layer of a neural network based on deep learning, the primary stream expression being a fixed-length vector of a word sequence corresponding to each speaker's speech recorded in a setting including a plurality of speakers;
  a step for generating a primary multi-stream expression obtained by integrating the primary stream expression;

a step for generating a secondary stream expression for each speaker by a second intermediate layer of the neural network, the secondary stream expression being a fixed-length vector generated by inputting the word sequence of each speaker and the primary multi-stream expression simultaneously into the second intermediate layer of the neural network;

a step for generating a secondary multi-stream expression obtained by integrating the secondary stream expression.

9. The document identification method according to claim 8, wherein the secondary stream expression is a fixed-length vector that is generated by calculating a function having a feature of a recurrent neural network based on the word sequence and the primary multi-stream expression.

10. The document identification method according to claim 8, comprising:

a step for calculating a posteriori probability with respect to a predetermined class, based on the secondary multi-stream expression.

11. The document identification method according to claim 10, wherein the secondary stream expression is a fixed-length vector that is generated by calculating a function having a feature of a recurrent neural network based on the word sequence and the primary multi-stream expression.

* * * * *